Patented Nov. 20, 1951

2,576,075

UNITED STATES PATENT OFFICE 2,576,075

INTERPOLYMERS OF UNSATURATED NITRILES

Marguerite Naps, Oakland, and Fred E. Condo, El Cerrito, Calif., assignors to Shell Development Company, San Francisco, Calif., a corporation of Delaware No Drawing. Application May 24, 1948,
Serial No. 28,973

13 Claims. (Cl. 260—78.5)

This invention relates to a new class of interpolymers. More particularly the invention relates to a novel group of interpolymers produced from the alpha-substituted, alpha,beta-unsaturated nitriles.

More specifically the invention provides a new and particularly useful class of interpolymers which are prepared by interpolymerizing alpha-substituted, alpha,beta-unsaturated nitriles with certain quantities of an alpha-alkyl substituted styrene, preferably alpha-methyl styrene, and certain quantities of an unsaturated ester of an organic acid. The resins obtained from the novel interpolymers of the invention are characterized by the fact that while they are classified as thermoplastic resins they possess many of the characteristic properties of both the thermoplastic resins and the thermosetting resins and are thus able to be utilized for industrial purposes for which many of the known thermoplastic resins and thermosetting resins by themselves are entirely unsuited.

There are two general classes of resins in use in industry, the thermoplastic resins and the thermosetting resins. The thermoplastic resins possess many desirable properties, such as a high degree of flexibility, but they possess the unfavorable characteristic of becoming soft and losing their shape when exposed to relatively high temperatures, i. e. they possess a low heat-distortion point. The thermosetting resins on the other hand possess many of the properties lacking in the thermoplastic resins, such as a high heat resistance, but they in turn lack many of the superior properties of the thermoplastic resins, e. g. they are generally brittle and have a low flexural strength. Industry is, therefore, in need of a relatively inexpensive resin which embraces many of the ideal properties of both the thermosetting resins and the thermoplastic resins, e. g. a resin which possesses a high flexibility and at the same time posseses a relatively high heat-distortion point and a high degree of hardness.

It is therefore an object of the invention to provide a new class of resins which possess many of the desirable properties of the thermoplastic resins and many of the desired properties of the thermosetting resins. It is a further object of the invention to provide a new class of resins which possess excellent flexibility and at the same time possess a relatively high heat-distortion point and high degree of hardness. It is a further object of the invention to provide novel interpolymers of the alpha-substituted, alpha,-beta-saturated nitriles which may be produced in a very economical and practical manner and may be utilized for a great many industrial purposes for which many of the known unsaturated nitrile resins are entirely unsuited. It is a further object of the invention to provide novel resins of methacrylonitrile which possess a high heat-distortion point. Other objects will be apparent from the detailed description of the invention given hereinafter.

It has now been discovered that these and other objects may be accomplished by interpolymerizing an alpha-substituted, alpha,beta-unsaturated nitrile with certaain quantities of an alpha-alkyl substituted styrene, preferably methyl styrene, and certain quantities of an unsaturated ester of an organic acid. The resins obtained from the interpolymers produced by this process possess many of the superior properties of the thermoplastic resins, such as their high degree of flexibility, and at the same time possess a very high heat-distortion point and high degree of hardness which are characteristic of the thermosetting resins. The resins of the novel interpolymers are thus able to be utilized for a great many purposes in industry for which the known thermoplastic resins and thermosetting resins by themselves are unsuited.

The production of resins from these components which possesses the above-described combination of properties was highly unexpected in view of the fact that the resins resulting from the co-polymerization of styrene with the unsaturated nitriles and the resins resulting from the co-polymerization of the unsaturated nitriles with various unsaturated esters display properties which are in some cases inferior to the properties of both the thermoplastic and thermosetting resins. In addition, prior to this time, it has been considered difficult if not impossible to copolymerize the alpha-alkyl styrenes, such as alpha-methyl-styrene, with many of the known polymerizable compounds.

The alpha-substituted, alpha,beta-unsaturated nitriles to be utilized in the production of the novel interpolymers of the invention are those nitriles possessing at least one unsaturated linkage between two carbon atoms of aliphatic character, one of the said carbon atoms of the unsaturated linkage being attached directly to the nitrile group and to an open-chain hydrocarbon radical or substituted open-chain hydrocarbon radical. The alpha-substituted, alpha,beta-unsurated nitriles may be represented by the following general formula:

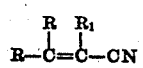

wherein $R_1$ is a member of the group comprising open-chain hydrocarbon radicals and substituted open-chain hydrocarbon radicals and each R is a member of the group comprising a hydrogen atom, a halogen atom, a hydrocarbon radical, or a substituted hydrocarbon radical.

The open-chain hydrocarbon radicals which $R_1$ may represent in the above-described formula may be the saturated straight and branch-chained hydrocarbon radicals, such as methyl, ethyl, propyl, isopropyl, butyl, and the like; and the unsaturated straight and branch-chained hydrocarbon radicals, such as propenyl, isopropenyl, butenyl, and the like.

The substituted open-chain hydrocarbon radicals which $R_1$ may represent are the same as those open-chain hydrocarbon radicals described above wherein at least one of the hydrogen atoms has been replaced by a non-interfering substituent, such as the halogen atoms, carboxyl radicals, and the like. Examples of the substituted open-chain hydrocarbon radicals are 2-chloropropyl, 4-bromo-2-butenyl, 3-acetoxy-propyl, and the like.

The hydrocarbon radicals which R may represent in the above-described formula may be cyclic or acyclic, saturated, or unsaturated. Examples of these hydrocarbon radicals are ethyl, propyl, isopropyl, butyl, propenyl, butenyl, pentenyl, isopentyl, hexenyl, cyclopentyl, and the like. The substituted hydrocarbon radicals which R may represent are the same as the above-noted hydrocarbon radicals wherein at least one of the hydrogen atoms has been replaced by a non-interfering substituent, such as the halogen atoms, carboxyl radicals and the like.

Examples of the alpha-substituted, alpha,-beta-unsaturated nitriles, which may be used in the production of the novel interpolymers of the invention are:

Methacrylonitrile
Alpha-ethyl acrylonitrile
Alpha-butenyl acrylonitrile
2-butyl 2-hexenenitrile
2-propenyl 2-pentenenitrile
2-chloroethyl 2-butenenitrile
2-ethyl 3-chloro 2-butenenitrile
2-isopropyl 3-bromo 2-pentenenitrile
Alpha-isopropyl beta-cyclohexyl acrylonitrile A group of the above-described alpha-substituted, alpha,beta-unsaturated nitriles which are particularly preferred in the formation of the novel interpolymers of the invention are those of the above-described general formula wherein $R_1$ is an alkyl radical containing from 1 to 3 carbon atoms and each R is a member of the group comprising the hydrogen atoms and alkyl radicals containing from 1 to 3 carbon atoms. Examples of this particularly preferred group of the alpha-substituted, alpha,beta-unsaturated nitriles are:

Methacrylonitrile
Alpha-ethyl acrylonitrile
Alpha-isopropyl acrylonitrile
2-isopropyl 2-pentenenitrile
2-propyl 2-hexenenitrile
2-ethyl 5-methyl 2-hexenenitrile The alpha-alkyl substituted styrenes to be interpolymerized with the above-described unsaturated nitriles and the unsaturated esters may be any of the styrene compounds wherein the hydrogen atom on the alpha carbon atom of the side chain has been replaced by a lower alkyl radical, containing from 1 to 3 carbon atoms, such as methyl, ethyl, propyl, isopropyl and the like. The hydrogen atoms on the nuclear carbon atoms of the styrene molecule may be replaced if desired by other non-interfering substituents, such as halogen atoms, or short-chain aliphatic hydrocarbon radicals, containing from 1 to 4 carbon atoms, such as ethyl, propenyl, methyl, butyl, and the like. Examples of the alpha-alkyl substituted styrenes which may be used in the interpolymerization includes alpha-methyl styrene, alpha-ethyl styrene, alpha-methyl 4-butyl styrene, alpha-ethyl 2,5-dimethyl styrene, and alpha-methyl 4-chloro styrene. Alpha-methyl styrene, however, is by far the more preferred alpha-alkyl substituted styrene to be used for the interpolymerization.

The unsaturated esters of the organic acids to be interpolymerized with the unsaturated nitriles and the alpha-substituted styrenes may be any ester-type compound possessing at least one unsaturated linkage between two carbon atoms of aliphatic character. The unsaturated linkage may be located either in the alcohol portion of the ester, in the acid portion of the ester molecule, or in both the alcohol and acid portion of the ester molecule.

The acid portion of the ester-type compound may be derived from an organic acid which may be either monobasic or polybasic. Such acids include acetic acid, butyric acid, acrylic acid, cyclohexanoic acid, malonic acid, glutaric acid, benzoic acid and phthalic acid, and the like.

The alcohol portion of the ester-type compound may be derived from any aliphatic, acyclic or aromatic alcohol which may be either monohydric or polyhydric. Such alcohols include vinyl alcohol, allyl alcohol, methyl alcohol, pentanol, 3-butenol, 2-chloro-1-hexenol, crotyl alcohol, cyclohexanol, glycol, glycerol, sorbitol and the like.

Various combinations of the above-described acids and alcohols may be made in order to arrive at the proper combination for the production of the desired unsaturated ester. Examples of the unsaturated esters that may be used to produce the novel interpolymers are methyl acrylate, butyl methacrylate, vinyl acetate, allyl vinyl phthalate, cyclohexyl methacrylate, vinyl benzoate, vinyl stearate, vinyl glutarate, methyl alpha-chloroacrylate, diethyl maleate, and the like.

A preferred group of the unsaturated esters are the esters of (I) the monocarboxylic acids containing from 1 to 6 carbon atoms, and (II) the monohydric alcohols containing from 1 to 6 carbon atoms wherein there is at least one olefinic double bond present somewhere in the ester molecule. Examples of the preferred group of unsaturated esters are vinyl acetate, methyl acrylate, vinyl butyrate, butyl methacrylate, allyl acrylate, cyclohexyl methacrylate, and the like.

A still more preferred group of unsaturated esters are those of the formula:

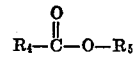

wherein $R_4$ and $R_5$ are members of the group comprising the saturated, open-chain hydrocarbon radicals containing from 1 to 6 carbon atoms and the olefinic unsaturated, open-chain hydrocarbon radicals containing from 2 to 6 carbon atoms. The saturated hydrocarbon radicals are exemplified by methyl, ethyl, butyl, isobutyl, amyl, and hexyl. The unsaturated hydrocarbon radicals are exemplified by allyl, vinyl, 4-butenyl, 4-hexenyl, and the like.

In the production of the novel interpolymers of the invention, a single alpha-substituted, alpha,beta-unsaturated nitrile may be interpolymerized with a single alpha-alkyl substituted styrene and a single unsaturated ester, or a mixture of one or all of the components may be interpolymerized together. Thus, for example, methacrylonitrile may be interpolymerized with alpha-methyl styrene and a mixture of vinyl acetate and methyl methacrylate, a mixture of methacrylonitrile and alpha-ethyl acrylonitrile may be interpolymerized with alpha-methyl styrene and vinyl acetate, or methacrylonitrile may be interpolymerized with a mixture of alpha-methyl styrene and vinyl acetate.

The components described above may also be interpolymerized in the presence of already-formed plastics, including natural resins, cellulose derivatives, synthetic resins, etc. Other modifiers, including plasticizers, stabilizers, lubricants, dyes, pigments and fillers may be added during the polymerization process provided they do not chemically react with or otherwise adversely affect the ingredients of the reaction mixture, otherwise, these modifiers may be added following polymerization. Examples of modifying agents and pigments that may be added are wood flour, wood fiber, paper dust, clay, glass wool, mica, granite dust, silk flock, cotton flock, steel wool cloth, sand titanium oxide, lead oxide, chrome yellow, gum, oils, wax and the like.

The mixture may be polymerized in bulk in the presence or absence of a solvent or diluent or mixtures thereof. If a solvent is used the substance may be a solvent for the reactants and polymer, or may be a solvent for the reactants and non-solvent for the polymer. Emulsifying, granulating and wetting agents may also be present. It is also possible to effect polymerization by atomizing the reactants or solution thereof in the form of a fine spray into a heated chamber containing an inert gas. It is likewise feasible to polymerize the mixture while it is dispersed in the interstices of fibrous material such as a fabric.

The proportion of each of the three components to be used in producing the novel interpolymers should vary within certain limits in order to produce interpolymers possessing the above-described properties. Interpolymers possessing the desired properties are obtained when the quantity of the alpha-alkyl substituted styrene is maintained between about 10% and about 40%; the quantity of the unsaturated ester is maintained between about 5% and about 25%; and the quantity of the alpha-substituted alpha, beta-unsaturated nitrile is maintained between about 85% to about 50% by weight of the total reactants. Amounts of the alpha-alkyl substituted styrene around 50% or slightly above could be used but such quantities are not desirable due to the difficulty with which such large quantities of the substituted styrene undergo polymerization. The maximum display of the above-described superior properties is obtained when the amount of the alpha-alkyl substituted styrene compound varies between about 10% to 30%; the quantity of the unsaturated ester is maintained between 5% to about 15%; and the quantity of the alpha-substituted alpha,beta - unsaturated nitrile is maintained between 85% to about 65% by weight of the total reactants and these are the preferred proportions to be used in the interpolymerization.

The polymerization is energized by the application of heat and/or light in the presence of a polymerization catalyst. When heat is to be applied, temperatures between about 30° C. and about 150° C. are usually sufficient to accomplish the desired polymerization. A preferred temperature range lies between about 40° C. to about 80° C.

Catalysts that may be utilized in the polymerization include the per-acid catalysts such as persulfuric acid, peracetic acid, and perphthalic acid, the per-salts, such as potassium persulfate, the peroxide catalysts, such as hydrogen peroxide, benzoyl peroxide, succinyl peroxide, dilauryl peroxide, dibutyl peroxide, sodium peroxide, tert-alkyl hydroperoxides, such as tert-butyl hydroperoxide. If desired, mixtures of the polymerization catalysts may be employed.

The amount of the catalyst employed may vary over a considerable range depending upon the various conditions of reaction. In most cases the amount of catalyst will vary between about .01% to about 2% by weight of the material to be polymerized. A preferred amount of catalyst will vary between about .01% to about 1% by weight.

Atmospheric, reduced, or superatmospheric pressures may be used in the polymerization process. In those cases where the polymerization is maintained above the boiling point of the polymerizable mixture increased pressures may be maintained to prevent the boiling away of the components.

The polymerization reaction may be carried to completion without substantial interruption or it may be stopped at any point short of completion. Incomplete polymerization may be used for the production of syrup which may be further worked and eventually substantially completely polymerized. The syrup, for instance, may be transferred to a mold of any desired configuration and again subjected to polymerization conditions or it may be used in coating operations, or in impregnating bibulous, e. g. fibrous material which in turn may be used in the production of laminates. Unreacted polymerizable material may be separated from the polymer by any suitable method, such as filtration, extraction, distillation, and the like.

The polymerization may be accomplished in any type of apparatus and may be conducted in a batch, semi-continuous or continuous manner as desired.

A particularly preferred method for the interpolymerization of the unsaturated nitriles with the alpha-alkyl substituted styrenes and the unsaturated esters comprises an aqueous emulsion polymerization process. In this preferred method the desired polymerizable mixture is added to an aqueous emulsion comprising water, an emulsifying agent and the desired polymerization catalyst and the resulting mixture is subjected to polymerization conditions.

Emulsifying agents that may be employed in the preferred polymerization procedure includes the soaps, such as sodium and potassium myristate, laurate, palmitate, oleate, stearate, rosinate, and hydroabietate; alkali metal alkyl or alkylene sulfonates or sulfates such as sodium and potassium lauryl sulfates, cetyl sulfate, olevl sulfonate, stearyl sulfonate, Turkey red oil, sulfonated mineral oil, as well as ammonium salts thereof; salts of higher amines like lauryl amine hydrochloride, and stearyl amine hydrobromide; and high molecular weight materials, such as sodium polyacrylate, methylcellulose, and the like.

The amount of the emulsifying agent to be employed will vary over a considerable range depending upon the particular compound to be polymerized, the amount of water present in the mixture, and the kind and amount of water present in the mixture, and the kind and amount of other ingredients added thereto. In general the amount will vary from about .1% to about 10% by weight of the water present in the reaction medium. The preferred amount of the emulsifying agent to be employed will vary between about .5% to about 5% by weight of water.

In the aqueous emulsion polymerization procedure it is sometimes desirable to maintain the emulsion in an acid state, e. g. in a pH of about 1 to 6. This may be accomplished by the use of the proper emulsifying agent which will function effectively in acid mediums such as sodium alkyl sulfates or amine salts like lauryl amine hydrochloride and by adjusting the pH with the addition of a strong mineral acid such as hydrochloric, sulfuric or nitric acids.

While any of the above-described catalysts may be utilized in the aqueous emulsion polymerization process it is usually preferred to utilize a persalt catalyst, such as sodium or potassium persulfate. The amount of the catalyst utilized will depend upon the various conditions of reaction but will, in general, vary between about .01% to about 2% of the total reactants.

The total amount of the polymerizable material to be added to the aqueous emulsion may vary over a considerable range depending upon the nature of the various ingredients and the amount of water present in the emulsion. In most cases it is desirable to maintain the ratio of polymerizable material to water smaller than 1 to 2. When the ratio is larger than 1 to 2 the emulsion, in some cases, becomes too thick to be handled efficiently and the results are not as satisfactory as desired. The preferred ratio of the polymerizable material to the water in the emulsion mixture varies between about 1 to 3 and 1 to 5.

Temperatures employed during the aqueous emulsion polymerization will, in most cases, vary between about 30° C. to about 100° C. with a preferred temperature range being between about 40° C. to about 90° C. Atmospheric pressure is usually the preferred pressure to be employed during the aqueous emulsion polymerization.

The usual reactor for the emulsion polymerization is fitted with blades or paddles for keeping the emulsion in a state of agitation during the polymerization process. The reactor may also contain heating or cooling means such as coils for circulating steam or heated oils, or cold water for cooling.

The aqueous emulsion polymerization process is particularly efficient when conducted in a continuous manner. In this preferred manner of conducting the process the polymerizable material is conducted through a series of distinct reaction zones like separate connected reaction chambers. The flow in the process is such that it continuously advances from chamber to successive chamber without appreciable, or preferably no back flow. The number of reaction zones in series is preferably at least four and may be as many as twenty or higher. Additional polymerizable material is continuously introduced at one or more of the reaction zones other than the first. A more detailed description of a continuous aqueous emulsion polymerization process is found in a co-pending application of Willem L. J. De Nie, Serial No. 681,681, filed July 6, 1946, now U. S. Patent No. 2,537,334.

The polymers formed during the polymerization process will, in most cases, be obtained in the form of a latex which may be readily separated from the reaction mixture by any suitable means comprising coagulation with electrolytes, solvents, freezing and the like.

The interpolymers obtained by the interpolymerization of the unsaturated nitriles, alpha-substituted styrenes and the unsaturated ester will be substantially colorless powders possessing a relatively high molecular weight. Resins obtained from the novel interpolymers are characterized by their high heat-distortion point, their excellent flexibility and improved color. The resins may readily be cast into sheets, rods, tubes, and the like, or any desired shapes or sizes. They may also be subjected to extrusion and to injection and compression molding in the presence or absence of added diluents. They also may be utilized in the molten or solvent solution in the production of surface coatings and impregnating agents. Because of their exceptionally high heat-distortion point and their excellent flexibility the novel resins are particularly adapted for the production of articles which must withstand off-sided pressures and must be subjected to relatively high sterilization temperatures, such as specialized medical instruments, and the like.

To illustrate the manner in which the invention may be carried out the following examples are given. It is to be understood, however, that the examples are for the purpose of illustration only and they are not to be regarded as limiting the invention in any way.

The heat distortion points reported in the following examples were determined by ASTM test D-648-41-T under the conditions that the samples were heated in air at one degree per minute.

Example I

A series of polymers were prepared in an aqueous emulsion from the materials indicated in the table below. The total monomer (100 parts) was added to a mixture consisting of 300 parts of water, 1 part of potassium persulfate, and 1 part of sodium lauryl sulfate and the resulting mixture heated to 50° C. The polymers obtained in each case were molded under the following conditions: preformed preheated for 15 minutes in an oven at 135° C. and then molded for 12 minutes at 155° C. to 160° C. and 4000 p. s. i. Some of the physical properties of the resulting resins are shown in the following table.

| Material polymerized, per cent by weight | Heat distortion Point | Affect when placed in boiling water |
| --- | --- | --- |
| | ° C. | |
| MAN [1] | 90 to 94 | softening and surface blanching. |
| MAN, 70; S, 30 | 88 | surface blanching. |
| MAN, 70; VA, 30 | 74 | softening and surface blanching. |
| MA, 75; MA, 5; AS, 20 | 102 | No affect. |
| MA, 70; MA, 5; AS, 30 | 103 | Do. |
| MA, 65; MA, 5; AS, 30 | 103 | Do. |
| MA, 60; MA, 15; AS, 25 | 103 | Do. |
| MA, 60; MA, 10; AS, 30 | 103 | Do. |

[1] MAN—methacrylonitrile. MA—methyl acrylate. AS—alpha-methyl styrene. S—styrene.

Example II

About 65 parts of methacrylonitrile, 20 parts of alpha-methyl styrene and 15 parts of methyl acrylate were interpolymerized according to the procedure outlined in Example I. The resin obtained from the resulting polymer possessed a heat distortion of 103° C., was unaffected when placed in boiling water for 15 minutes and possessed a high degree of flexibility.

Example III

About 70 parts of methacrylonitrile are polymerized with about 15 parts of allyl vinyl phthalate and 15 parts of alpha-methyl chloro-styrene in an aqueous emulsion. The resin obtained from the resulting polymer possesses a very high heat distortion point, does not soften or discolor when added to boiling water, and possess a high degree of flexibility.

Example IV

About 60 parts of alpha-ethyl acrylonitrile are polymerized with about 20 parts of vinyl butyrate and 20 parts of alpha-methyl styrene by bulk polymerization in the presence of 1 part of benzoyl peroxide. The resin obtained from the resulting polymer possess a very high heat distortion point, does not soften or discolor when added to boiling water, and possesses a high degree of flexibility.

Example V

Samples of the novel interpolymers are prepared by polymerizing 70% of methacrylonitrile with 15% of alpha-methyl styrene and 15% of each of the following unsaturated esters: allyl vinyl phthalate, butyl methacrylate, vinyl butyrate, cyclohexyl methacrylate, and butyl acrylate.

We claim as our invention:

1. A resin comprising an interpolymer of 65% methacrylonitrile, 20% of alpha-methyl styrene and 15% of methyl acrylate, said percentages being by weight of the total polymerizable components.

2. A resin comprising an interpolymer of 70% methacrylonitrile, 15% of alpha-methyl chloro-styrene and 15% allyl vinyl phthalate, said percentages being by weight of the total polymerizable components.

3. A resin comprising an interpolymer of 70% of methacrylonitrile, 25% alpha-methyl styrene and 5% vinyl acetate, said percentages being by weight of the total polymerizable components.

4. A resin comprising an interpolymer of about 85% to about 65% of methacrylonitrile, about 10% to about 30% of alpha-methyl styrene and about 5% to about 15% of methyl acrylate, said percentages being by weight of the total polymerizable components.

5. A resin comprising an interpolymer of 85% to 65% methacrylonitrile, about 10% to 30% of alpha-ethyl styrene and about 5% to 15% of allyl vinyl phthalate, said percentages being by weight of the total polymerizable components.

6. A resin comprising an interpolymer of 85% to 65% methacrylonitrile, about 10% to 30% alpha-methyl styrene and about 5% to 15% vinyl acetate, said percentages being by weight of the total polymerizable components.

7. A resin comprising an interpolymer of about 85% to about 65% of methacrylonitrile, about 10% to about 30% of alpha-methyl styrene, and about 5% to about 15% of an unsaturated ester of (1) a monocarboxylic acid containing from 1 to 6 carbon atoms and (2) a monohydric alcohol containing from 1 to 6 carbon atoms wherein there is at least one olefinic double bond somewhere in the ester molecule, said percentages being by weight of the total polymerizable components.

8. An interpolymer of 85% to 65% of methacrylonitrile, 10% to 30% of an alpha-alkyl styrene wherein the alkyl radical contains from 1 to 3 carbon atoms, and 5% to 15% of an unsaturated ester of (1) a monocarboxylic acid containing from 1 to 6 carbon atoms and (2) a monohydric alcohol containing from 1 to 6 carbon atoms, said ester containing at least one olefinic double bond, and the said percentages being by weight of the total polymerizable components.

9. An interpolymer of 85% to 65% of an unsaturated nitrile of the formula

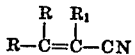

wherein $R_1$ is an open-chain hydrocarbon radical and R is a member of the group consisting of hydrogen and hydrocarbon radicals, 10% to 30% of an alpha-substituted styrene comprising a styrene molecule wherein the alpha carbon atom on the side chain is attached to an alkyl radical containing from 1 to 3 carbon atoms and the nuclear carbon atoms are attached to a member of the group consisting of the hydrogen atom, the halogen atoms, and alkyl radicals containing from 1 to 4 carbon atoms, and 5% to 15% of an unsaturated ester of an organic acid, said ester containing at least one olefinic double bond, and the said percentages being by weight of the total polymerizable components.

10. An interpolymer of 85% to 50% of an unsaturated nitrile of the formula

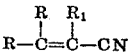

wherein $R_1$ is an open-chain hydrocarbon radical and R is a member of the group consisting of hydrogen and hydrocarbon radicals, 10% to 30% of an alpha-substituted styrene comprising a styrene molecule wherein the alpha carbon atom on the side chain is attached to an alkyl radical containing from 1 to 3 carbon atoms and the nuclear carbon atoms are attached to a member of the group consisting of the hydrogen atom, the halogen atoms, and alkyl radicals containing from 1 to 4 carbon atoms, and 5% to 25% of an unsaturated ester of an organic acid, said ester containing at least one olefinic double bond, and the said percentages being by weight of the total polymerizable components.

11. An interpolymer of 85% to 65% of an unsaturated nitrile of the formula

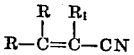

wherein $R_1$ is an open-chain hydrocarbon radical and R is a member of the group consisting of hydrogen and hydrocarbon radicals, 10% to 30% of an alpha-alkyl styrene wherein the alkyl radical contains from 1 to 3 carbon atoms, and 5% to 15% of an unsaturated ester of (1) of a monocarboxylic acid containing from 1 to 6 carbon atoms and (2) a monohydric alcohol containing from 1 to 6 carbon atoms wherein the ester molecule contains at least one olefinic double bond, said percentages being by weight of the total polymerizable materials.

12. An interpolymer as defined in claim 11 wherein the alpha-alkyl styrene is alpha-methyl styrene.

13. An interpolymer as defined in claim 11 wherein the unsaturated ester is methyl acrylate.

MARGUERITE NAPS.
FRED E. CONDO.

(References on following page)

References Cited

The following references are of record in the file of this patent:

UNITED STATES PATENTS

| Number | Name | Date |
|---|---|---|
| 2,140,048 | Fikentscher et al. | Dec. 13, 1938 |
| 2,230,784 | Reppe et al. | Feb. 4, 1941 |
| 2,310,961 | Kropa | Feb. 16, 1943 |
| 2,335,651 | D'Alelio | Nov. 30, 1943 |
| 2,381,338 | Cornthwaite et al. | Aug. 7, 1945 |
| 2,399,684 | Mack | May 7, 1946 |
| 2,417,293 | D'Alelio | Mar. 11, 1947 |
| 2,446,049 | Kropa | July 27, 1948 |